US008548692B2

(12) United States Patent
Morimoto et al.

(10) Patent No.: US 8,548,692 B2
(45) Date of Patent: Oct. 1, 2013

(54) TRAVEL VIBRATION SUPPRESSING DEVICE OF WORK VEHICLE

(75) Inventors: Katsuyuki Morimoto, Komatsu (JP); Motoki Ohba, Komatsu (JP); Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 89 days.

(21) Appl. No.: 13/393,036

(22) PCT Filed: Sep. 15, 2010

(86) PCT No.: PCT/JP2010/065894
§ 371 (c)(1),
(2), (4) Date: Feb. 28, 2012

(87) PCT Pub. No.: WO2011/043165
PCT Pub. Date: Apr. 14, 2011

(65) Prior Publication Data

US 2012/0155999 A1 Jun. 21, 2012

(30) Foreign Application Priority Data

Oct. 5, 2009 (JP) ................................ 2009-231397

(51) Int. Cl.
*G06F 7/70* (2006.01)

(52) U.S. Cl.
USPC ........................................................ 701/50

(58) Field of Classification Search
USPC ........................................................ 701/50
See application file for complete search history.

(56) References Cited

U.S. PATENT DOCUMENTS

| | | | | |
|---|---|---|---|---|
| 5,147,172 | A | 9/1992 | Hosseini | |
| 6,595,330 | B1 * | 7/2003 | Henrickson et al. | 187/277 |
| 8,010,260 | B2 * | 8/2011 | Toda | 701/50 |
| 2010/0131158 | A1 * | 5/2010 | Saito | 701/50 |
| 2010/0242637 | A1 * | 9/2010 | Inamori et al. | 74/15.86 |

FOREIGN PATENT DOCUMENTS

| | | | |
|---|---|---|---|
| JP | 05-209422 | A | 8/1993 |
| JP | 2000-309953 | A | 11/2000 |
| JP | 2005-220530 | A | 8/2005 |
| KE | 2003-343505 | A | 12/2003 |

OTHER PUBLICATIONS

International Search Report of corresponding PCT Application No. PCT/JP2010/065894.

* cited by examiner

*Primary Examiner* — Hussein A. Elchanti
(74) *Attorney, Agent, or Firm* — Global IP Counselors, LLP

(57) ABSTRACT

A travel vibration suppressing device is connected to a hydraulic cylinder for operating a work machine, and utilizes an accumulator to suppress vibration during travel of the vehicle. Upon determining that the state of the work machine is the excavating state, the control unit switches from a state of communication between a hydraulic cylinder and the accumulator to a blocked state when the vehicle speed changes from a speed exceeding a first speed to a speed equal to or less than the first speed. Upon determining that the operating state is the normal state, the state of communication between a boom cylinder and the accumulator is switched to the blocked state when the vehicle speed changes from a second speed lower than the first speed to a speed equal to or less than the second speed.

7 Claims, 6 Drawing Sheets

TRAVEL VIBRATION SUPPRESSING DEVICE OF WORK VEHICLE

CROSS-REFERENCE TO RELATED APPLICATIONS

This application claims priority to Japanese Patent Application No. 2009-231397 filed on Oct. 5, 2009,, the disclosure of which is hereby incorporated herein by reference in its entirety.

TECHNICAL FIELD

The present invention relates to a travel vibration suppressing device in a work vehicle, and relates in particular to a travel vibration suppressing device being connected to a hydraulic cylinder for operating a work machine and adapted to suppress vibration during travel of the vehicle.

BACKGROUND ART

A wheel loader, which is one example of a work vehicle, has a boom supported in moving up and down on the vehicle body; a bucket rotatably mounted to the distal end of the boom; and boom cylinders and bucket cylinders for operation thereof. Through operation of the boom and the bucket, excavation, hauling, or loading of earth or sand, or other such works are performed.

In some cases, a wheel loader of this kind travels with earth, sand, or the like loaded into the bucket. Due to the large mass of the vehicle as a whole when earth, sand, or the like has been loaded in the bucket, the vehicle may experience considerable vibration during travel. Because of this, ride quality may be diminished, and the bucket is likely to spill its load.

Thus, a conventional vehicle of this type is furnished with a travel vibration suppressing device. This travel vibration suppressing device provides a state of communication between a cylinder for operating a work machine, such as a boom cylinder or the like (herein, an example of a boom cylinder shall be described) and an accumulator when the vehicle is in a state of travel. In so doing, vibration during vehicle travel can be absorbed by the accumulator, and transmission of vibration from the boom cylinder to the vehicle as a whole can be minimized.

On the other hand, during work such as excavation with the bucket, for example, all of the power of the boom cylinders must be directed to the bucket. Specifically, if the boom cylinders and the accumulator are in communication during work, the power of the boom cylinders will be absorbed by the accumulator, and will not be transmitted efficiently to the bucket. This causes a drop in work efficiency.

In the devices shown in Japanese Laid-open Patent Application No. 05-209422 and Japanese Laid-open Patent Application No. 2000-309953,, the boom cylinders and the accumulator are placed in communication or blocked, depending on vehicle speed. Specifically, when the vehicle speed is less than a given threshold value, a working state is determined to exist and the boom cylinders and the accumulator are blocked; or when the vehicle speed is equal to or greater than the threshold value, a traveling state is determined to exist and the two are placed in communication. In so doing, during work, the power of the boom cylinders can be efficiently directed to the bucket, while during travel vibration can be minimized through absorption by the accumulator.

In Japanese Laid-open Patent Application No. 05-209422,, the boom cylinders and the accumulator are placed in communication when the vehicle speed reaches 5, km/h, whereas the two are not blocked by the time that the vehicle speed falls to 4.5, km/h or below. In so doing, frequent repeated communication and blocking between the boom cylinders and the accumulator when the vehicle speed hovers around the threshold value can be prevented.

SUMMARY

As mentioned above, in the conventional devices for suppressing vibration during travel, operation (communication between the boom cylinders and the accumulator) and non-operation (blockage between the boom cylinders and the accumulator) are controlled in a manner dependent on vehicle speed.

However, there are cases in which work performed at relatively high speed is encountered by way of actual service conditions. For example, under conditions such as with earth, sand, etc. having been excavated and loaded into the bucket, the vehicle then travels to and loads a dump truck, etc., waiting at another location. In such a situation, there may be cases in which the excavation work is performed as the vehicle maintains a relatively high speed. In conventional devices for suppressing vibration, under such working conditions it would be decided that a traveling state exists, despite the fact that a working state exists. Consequently, the travel vibration suppressing device would operate during the working state, and work efficiency during excavation would be poor.

Also, there are cases in which excessive hydraulic pressure is generated in the boom cylinders during excavation. If such excessive hydraulic pressure generated in the boom cylinders acts on the accumulator during high speed work, specifically, in a state with the travel vibration suppressing device in operation, there is a risk of damaging the accumulator having low pressure resistance.

Accordingly it is an object of the present invention to more accurately make a determination as to whether an excavating state exists or whether a normal state in which excavation is not performed exists, and to provide improved work efficiency particularly at relatively high speeds, while maintaining ride quality.

Another object of the present invention is to minimize the action of excessive hydraulic pressure on the accumulator in a travel vibration suppressing device designed to utilize the accumulator to absorb vibration during travel.

The travel vibration suppressing device of a work vehicle according to a first aspect is a device connected to a hydraulic cylinder for operating a work machine and adapted to suppress vibration of a vehicle during travel, the device being provided with an accumulator connected to the hydraulic cylinder; a control valve for bringing about communication or blocking between the hydraulic cylinder and the accumulator; a vehicle speed detecting device configured to detect vehicle speed of the work vehicle; a work machine state determination section; and a control unit. The work machine state determination section determines whether the state of the work machine is an excavating state in which excavation is expected to be performed using the work machine, or a normal state in which excavation by the work vehicle is not performed. The control unit controls the control valve according to the determination result of the work machine state determination section. Specifically, the control unit controls the control valve as follows.

Specifically, when the state of the work machine has been determined to be the excavating state, the control unit switches from a state of communication between the hydraulic cylinder and the accumulator to a blocked state when the vehicle speed changes from a speed exceeding a first speed to a speed which is equal to or less than the first speed. On the other hand, when the state of the work machine has been determined to be the normal state, the control unit switches from a state of communication between the hydraulic cylinder and the accumulator to a blocked state when the vehicle speed changes from a speed exceeding a second speed which is lower than the first speed to a speed which is equal to or less than the second speed.

With this device, whereas operation or non-operation of the travel vibration suppressing device is controlled in a manner dependent on vehicle speed, the vehicle speed threshold values employed for control are different depending on the state of the work machine. Specifically, it is first determined whether the state of the work machine is the excavating state or the normal state. When the excavating state is determined to exist, the hydraulic cylinder and the accumulator are switched from a state of communication therebetween to a blocked state when the vehicle speed has fallen to equal to or less than a first speed, and operation of the device is halted. On the other hand, if the normal state is determined to exist, the hydraulic cylinder and the accumulator are switched from a state of communication therebetween to a blocked state when the vehicle speed has fallen to equal to or less than a second speed which is lower than the first speed, and the device is caused to operate.

Here, when the state of the work machine is the excavating state, operation of the travel vibration suppressing device halts at a threshold value which is equal to a higher first speed. Therefore, in cases in which excavation is executed while maintaining relatively high vehicle speed, the power of the hydraulic cylinder will be transmitted directly to the work machine without being absorbed at the accumulator side. Therefore, work efficiency at relatively high speed is improved. Also, excessive hydraulic pressure can be prevented from acting on the accumulator during work, and damage to the accumulator can be minimized.

On the other hand, when the state of the work machine is the normal state, operation of the travel vibration suppressing device is halted at a threshold value which is equal to a lower second speed. In other words, in the normal state, vibration during travel can be suppressed even at low speed. Therefore, the ride quality during travel does not suffer.

The reason that the condition for making the determination that the excavating state exists is "excavation is expected to be performed" rather than that "excavation is actually being performed" is that if the threshold value of vehicle speed for operation versus non-operation of the device were modified subsequent to having transitioned to excavation work at relatively high speed, it is anticipated that cases may arise in which operation of the device would not be halted at the time of commencing excavation, so that sufficient power from the hydraulic cylinder would not be directed to the work machine. By modifying the threshold value of vehicle speed on the condition of "expected performance of excavation," the device, once already in operation, can be halted when commencing excavation at relatively high speed. Therefore, work can be performed with sufficient power from the commencement of excavation.

The travel vibration suppressing device according to a second aspect is the device according to the first aspect, wherein the control unit executes control as follows. Specifically, in the excavating state, the control unit places the hydraulic cylinder and the accumulator in a state of communication therebetween when the vehicle speed is equal to or greater than a third speed which is higher than the first speed. On the other hand, in the normal state, the control unit places the hydraulic cylinder and the accumulator in a state of communication therebetween when the vehicle speed is equal to or greater than a fourth speed which is higher than the second speed.

With this device, in the excavating state, operation commences at a threshold value (the third speed) which is different from the threshold value (the first speed) at which operation of the device halts. Specifically, hysteresis is introduced to the threshold values of operation and non-operation of the device. Therefore, frequent repeated switching between operation and non-operation of the device at a given speed can be prevented. The situation is exactly the same in the normal state as well.

The travel vibration suppressing device according to a third aspect is a device according to the first aspect, wherein the work machine has a boom lifted and lowered by the hydraulic cylinder, and a bucket rotatably mounted to the distal end of the boom via a hinge pin. The work machine state determination section determines the state of the work machine from the height of the bucket.

In a work vehicle having a bucket, it is typically possible to determine from the heightwise position of the bucket whether the excavating state or the normal state exists. In specific terms, the bucket would be set to a low position when performance of excavation is expected or when excavation is actually being performed. The bucket would be set to a relatively high position in the normal state.

Thus, according to the third aspect, the state of the work machine is determined as being in either the excavating state or the normal state, from the height of the bucket. In so doing, the state of the work machine can be determined more readily.

The travel vibration suppressing device according to a fourth aspect is a device according to the third aspect, wherein the work machine state determination section determines that the excavating state exists when the height of the bucket is equal to or less than a predetermined height, and determines that the normal state exists when the height of the bucket exceeds the predetermined height.

The travel vibration suppressing device according to a fifth aspect is a device according to the third aspect, wherein the work machine state determination section determines that the excavating state exists when the height of the bucket is equal to or less than a first height, and determines that the normal state exists when the height of the bucket is equal to or greater than a second height which is higher than the first height. The control unit then executes control as follows. Specifically, control is executed such that the state of the work machine remains in the excavating state until the height of the bucket reaches the second height when transitioning from the excavating state to the normal state. Control is executed such that the state of the work machine remains in the normal state until the height of the bucket reaches the first height when transitioning from the normal state to the excavating state.

Here, hysteresis is introduced to the threshold values of vehicle speed for the purpose of operation and non-operation of the device in each state, and hysteresis is introduced as well to the threshold values of height position of the bucket for the purpose of determining the state of the work machine. Therefore, frequent repeated switching between operation and non-operation of the device in cases in which the position of the bucket rises and falls in proximity to the threshold value during travel can be prevented.

The travel vibration suppressing device according to a sixth aspect is a device according to the third aspect, wherein the work machine state determination section designates the height of a hinge pin as the height of the bucket when determining the state of the work machine.

Here, because it is difficult to measure the heightwise position of the bucket, the height of the hinge pin which links the boom and the bucket is obtained, and designated as the bucket position.

The travel vibration suppressing device according to a seventh aspect is a device according to the third aspect wherein the work machine state determination section determines that the excavating state exists when the height of the bucket is equal to or less than a first height, determines that the normal state exists when the height of the bucket is equal to or greater than a second height which is higher than the first height, and determines that an intermediate state exists when the height of the bucket is lower than the second height which is higher than the first height. When the state of the work machine is determined to be the intermediate state, the control unit then places the hydraulic cylinder and the accumulator in the communicating state when the vehicle speed is equal to or greater than the third speed, and places the hydraulic cylinder and the accumulator in the blocked state when the vehicle speed is equal to or less than the second speed.

According to the invention set forth above, the determination as to whether the excavating state exists or the normal state in which excavation is not performed exists can be made more precisely, and sufficient power can be delivered to the work machine particularly at times of excavation at relatively high speed, while maintaining ride quality. Also, damage to the accumulator by excessive hydraulic pressure acting on the accumulator during excavation can be minimized.

DETAILED DESCRIPTION OF THE PREFERRED EMBODIMENTS

First Embodiment

External Structure

Figure 1:
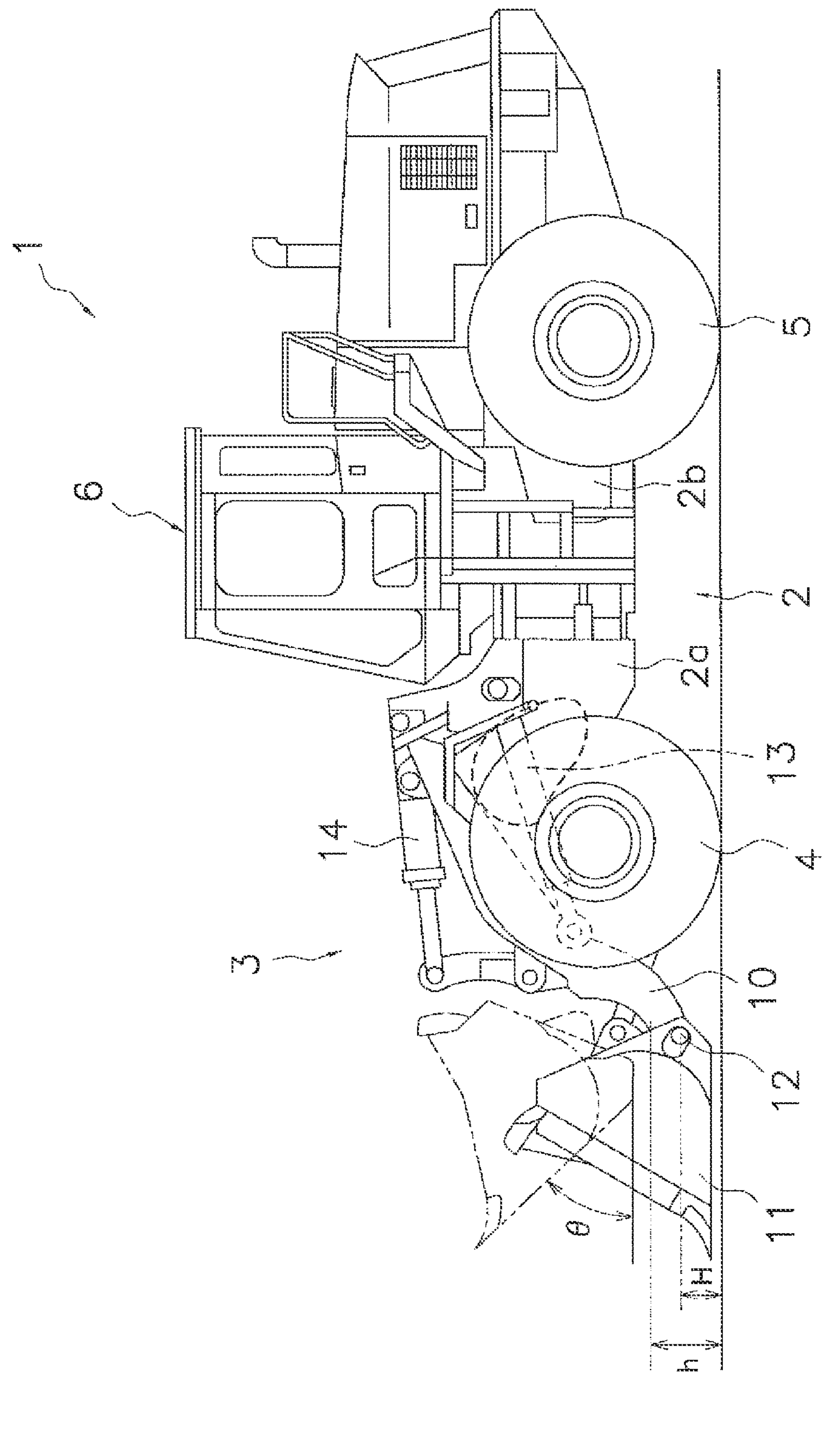
FIG. 1 is a side view of a wheel loader in which the travel vibration suppressing device according to an embodiment of the present invention has been adopted.

A side view of a wheel loader 1 is shown in FIG. 1 as a work vehicle according to a first embodiment of the present invention. This wheel loader 1 includes a vehicle frame 2, a work machine 3, front and rear tires 4, 5, and an operator's cab 6. The wheel loader 1 is self-propelled and performs desired work using the work machine 3.

In the following description, the terms "front," "rear," "left," and "right" show these directions as viewed by a worker seated in the operator's cab.

The vehicle frame 2 has a front frame 2*a*, disposed at the front side, and a rear frame 2*b*, disposed at the rear side. At the center section of the vehicle frame 2, the front frame 2*a*, and the rear frame 2*b*, are linked swivelably towards the left and right directions.

The work machine 3 has a pair of left and right booms 10, as well as a bucket 11. The pair of left and right booms 10 are rotatably supported at the rear ends thereof on the upper part of the front frame 2*a*. The bucket 11 is rotatably supported, via a hinge pin 12, at the respective front ends of the pair of left and right booms 10. A pair of left and right boom cylinders 13 for driving the respective booms 10 to effect lifting and lowering thereof are furnished between the front frame 2*a*, and the booms 10. Additionally, a bucket cylinder 14 for rotating the bucket 11 is provided between the front frame 2*a*, and the bucket 11. The boom cylinders 13 and the bucket cylinder 14 are hydraulic cylinders operated by hydraulic oil from a hydraulic pump.

The pair of front tires 4 are attached at the left and right side surfaces of the front frame 2*a;*, and the pair of rear tires 5 are attached at the left and right side surfaces of the rear frame 2*b*.

The operator's cab 6 is installed on the upper part of the rear frame 2*b*. The operator's cab 6 has operating portions such as a steering wheel, accelerator pedal and the like, a display for displaying various types of information such as speed and the like, and a seat and the like therein.

Also installed on the vehicle frame 2 are a hydraulic drive mechanism for driving the tires 4, 5 and the work machine 3, as well as a device for suppressing vibration adapted to suppress vibration during travel.

Travel Vibration Suppressing Device

Figure 2:
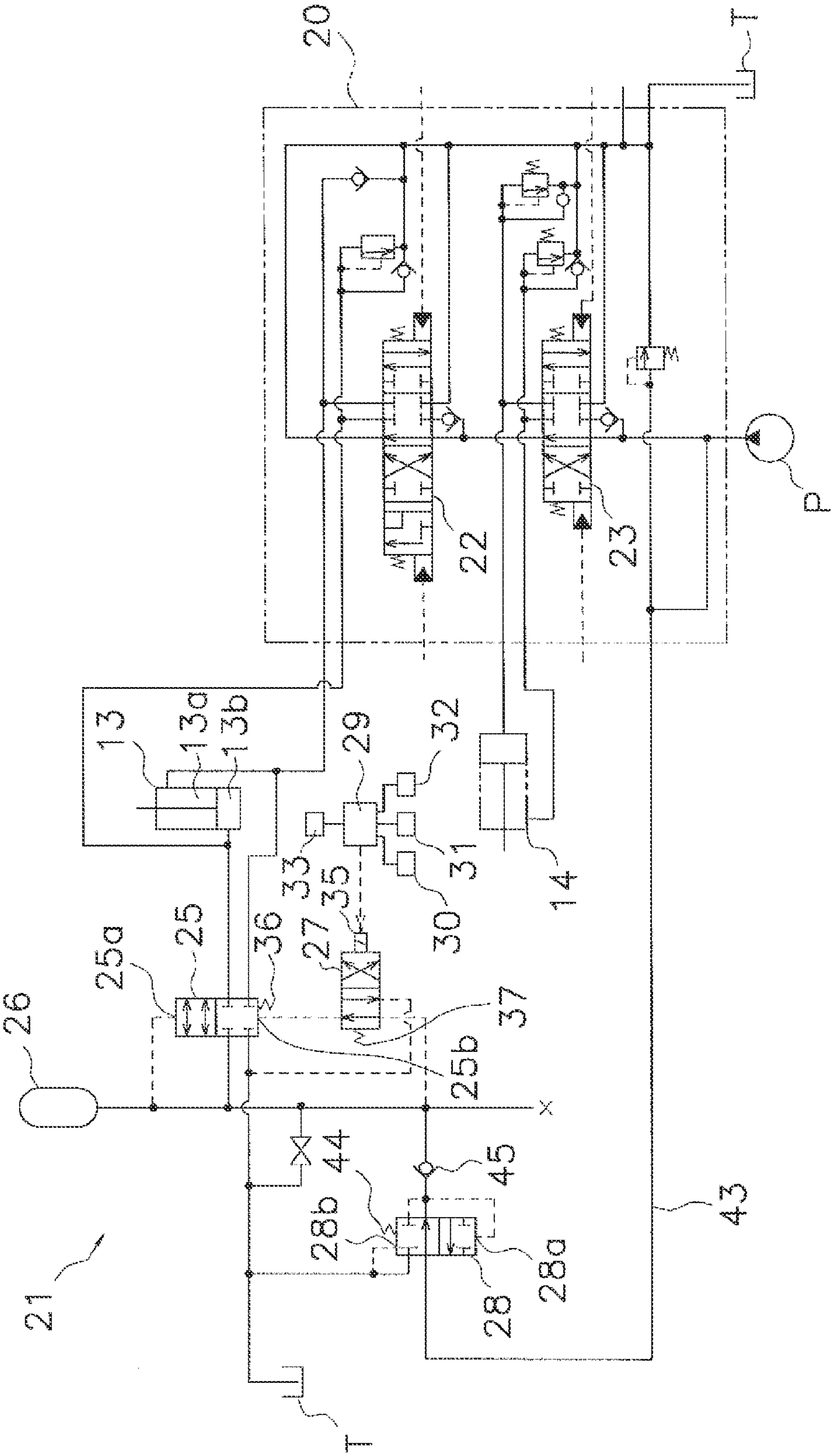
FIG. 2 is a hydraulic circuit diagram including the travel vibration suppressing device.

A hydraulic circuit system that includes a travel vibration suppressing device 21, and a hydraulic circuit 20 for driving the boom 10 and the bucket 11, is described with FIG. 2.

In this system, the hydraulic circuit 20 has a boom cylinder control valve 22 connected to the boom cylinders 13, and a bucket cylinder control valve 23 connected to the bucket cylinder 14. In specific terms, rod-side pressure chambers 13*a*, and bottom-side pressure chambers 13*b*, of the boom cylinders 13 are connected to the boom cylinder control valve 22. By switching this control valve 22, the hydraulic oil ejected from a pump P is directed into the rod-side pressure chambers 13*a*, or the bottom-side pressure chambers 13*b*. The boom cylinders 13 can be extended or retracted thereby. The bucket cylinder control valve 23 also has a tandem connection to the upstream side of the control valve 22.

An accumulator 26 is connected to the boom cylinders 13 via an on-off valve 25 serving as a control valve. A pilot valve 27 and a pressure reducing valve 28 are connected to the on-off valve 25. Switching of the pilot valve 27 is controlled by a controller 29. To the controller 29 are connected a speed sensor 30, a boom angle sensor 31 for detecting the height of the hinge pin 12, and a speed stage sensor 32. The on-off valve 25, the accumulator 26, the pilot valve 27, the pressure reducing valve 28, the controller 29, and the sensors 30, 31, 32 together constitute the travel vibration suppressing device 21 for suppressing vibration during travel. Because a proportional relationship exists between the boom angle and the height of the hinge pin, the height of the hinge pin 12 can be derived by detecting the boom angle. Based on inputs from the sensors 30, 31, 32, the controller 29 determines the operating state, and places a electromagnetic solenoid 35 of the pilot valve 27 in either the excited state or non-excited state.

The travel vibration suppressing device 21 will be described in detail. The rod-side pressure chambers 13*a*, of the boom cylinders 13 are connected to a tank T via the on-off valve 25. The bottom-side pressure chambers 13*b*, are connected to the accumulator 26 via the on-off valves 25. The pressure of the accumulator 26 is directed into one pilot chamber 25*a*, of the on-off valve 25. Another pilot chamber 25*b*, which is provided with a spring 36 alternately communicates with the accumulator 26 via the pilot valve 27, or communicates with the tank T.

When the electromagnetic solenoid 35 of the pilot valve 27 is in the non-excited state, as shown in FIG. 2, the pilot valve 27 assumes a normal position due to the spring 37. In this case, the pressure of the accumulator 26 will be directed into the other pilot chamber 25*b*, of the on-off valve 25. In this state, because the pressure directed into both of the pilot chambers 25*a*,, 25*b*, from the accumulator 26 is the same, the on-off valve 25 is maintained at the closed position by the spring 36, regardless of the level of pressure of the accumulator 26. In this closed position, the rod-side pressure chambers 13*a*, of the boom cylinders 13 are blocked from the tank T, and the bottom-side pressure chambers 13*b*, are blocked from the accumulator 26. In this state, because of blocking between the boom cylinders 13 and the accumulator 26, vibration during travel cannot be absorbed by the accumulator 26. Here, this is defined as the "travel damper OFF" state. In the travel damper OFF state, because the full power of the boom cylinders 13 is transmitted to the booms 10, a drop in work efficiency can be prevented.

On the other hand, when the electromagnetic solenoid 35 of the pilot valve 27 is brought to the excited state by the controller 29, the pilot valve 27 is switched, placing the other pilot chamber 25*b*, of the on-off valve 25 in communication with the tank T. In this state, due to action of the pressure of the accumulator 26 being directed into the first pilot chamber 25*a*,, the on-off valve 25 is switched to the open position in opposition to the spring 36. In this open position, the rod-side pressure chambers 13*a*, of the boom cylinders 13 communicate with the tank T, and the bottom-side pressure chambers 13*b*, communicate with the accumulator 26. In this state, because the boom cylinders 13 and the accumulator 26 communicate, vibration during travel can be absorbed by the accumulator 26. Here, this is defined as the "travel damper ON" state.

Figure 3:
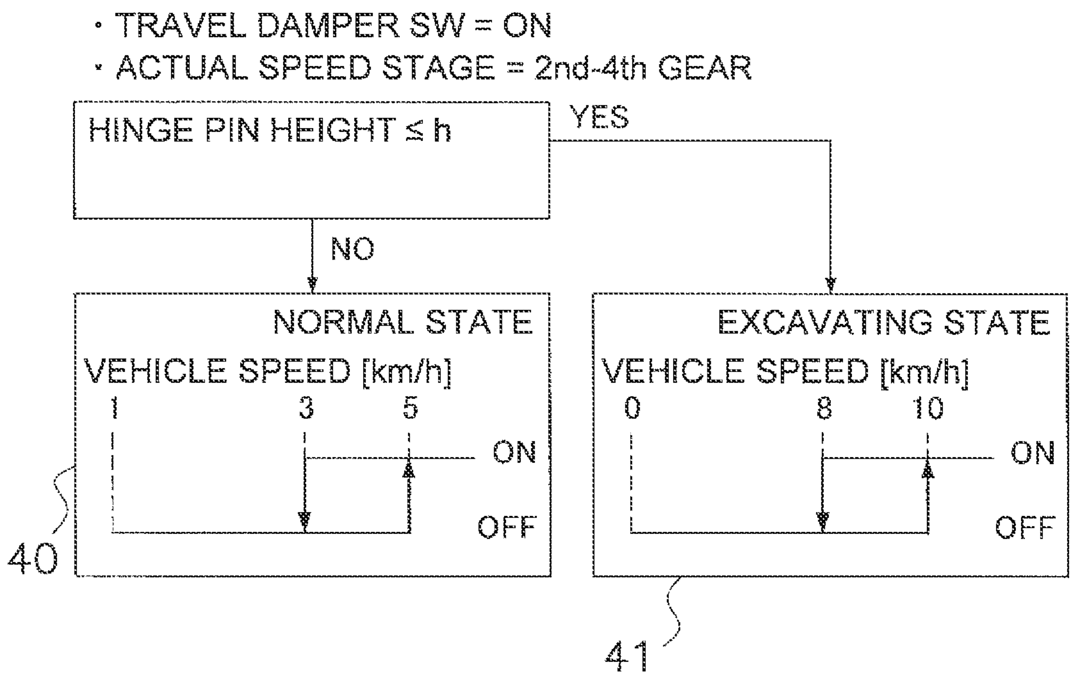
FIG. 3 is a view schematically depicting a control table.

In addition to signals from the sensors 30, 31, 32 mentioned previously, the controller 29 inputs a signal from a travel damper switch 33 provided inside the operator's cab 6. As shown in FIG. 3, the controller 29 stores a first table for the normal state 40 and a second table 41 for the excavating state, which are selected according to the state of the work machine. Threshold values of vehicle speed for the purpose of ON/OFF switching of the travel damper are set in these tables 40, 41; however, the values set as the threshold values differ between the first table 40 and the second table. As shown schematically in FIG. 3, the controller 29 decides whether the state of the work machine is the normal state or the excavating state on the basis of the signal from the travel damper switch 33 and the data from the speed stage sensor 32 and the boom angle sensor 31 (height of the hinge pin). In accordance with the result of the decision, the controller 29 executes a control process employing either the first table 40 or the second table 41.

Here, "excavating state" refers to a state in which excavation using the work machine 3 is expected to be performed. In specific terms, the "excavating state" is determined to exist in cases in which the height of the hinge pin is equal to or less than a predetermined height h.

The "normal state" refers to a state of the work machine which is not the excavating state mentioned above. In specific terms, the "normal state" is determined to exist in cases in which the height of the hinge pin exceeds the predetermined height h.

The hinge pin height h is specified with reference to a hinge pin height H that is observed when the position of the bucket is in an excavation orientation (the bucket position shown by solid lines in FIG. 1) in which it is substantially resting on the surface of the ground; here a value higher by a predetermined value than the hinge pin height H has been set. When the hinge pin height is equal to or less than h, one state in which excavation is expected to be performed, and the other state in which excavation is actually being performed are included. However, it is difficult to distinguish between these two states. Thus, because cases in which the hinge pin height is equal to or less than h will include at a minimum a state in which excavation is expected to be performed, the decision as to whether or not the excavating state exists is made with reference to hinge pin height only.

Here, in the system shown in FIG. 2, the upstream side of the control valves 22, 23 is connected to the accumulator 26 side via a branched passage 43. This branched passage 43 is furnished with the pressure reducing valve 28. Pressure to the downstream side of the pressure reducing valve 28 is directed into one pilot chamber 28*a*, of the pressure reducing valve 28. Another pilot chamber 28*b*, furnished with a spring 44 communicates with the tank T.

When the ejection pressure of the pump P directed into the branched passage 43 is higher than a predetermined pressure, the pressure reducing valve 28 reduces this pressure, keeping the pressure to the downstream side at a pressure setting specified by the spring 44. Further, a check valve 45 for preventing backflow of hydraulic oil from the accumulator 26 side is disposed to the downstream side from this pressure reducing valve 28.

Control Process

Figure 4:
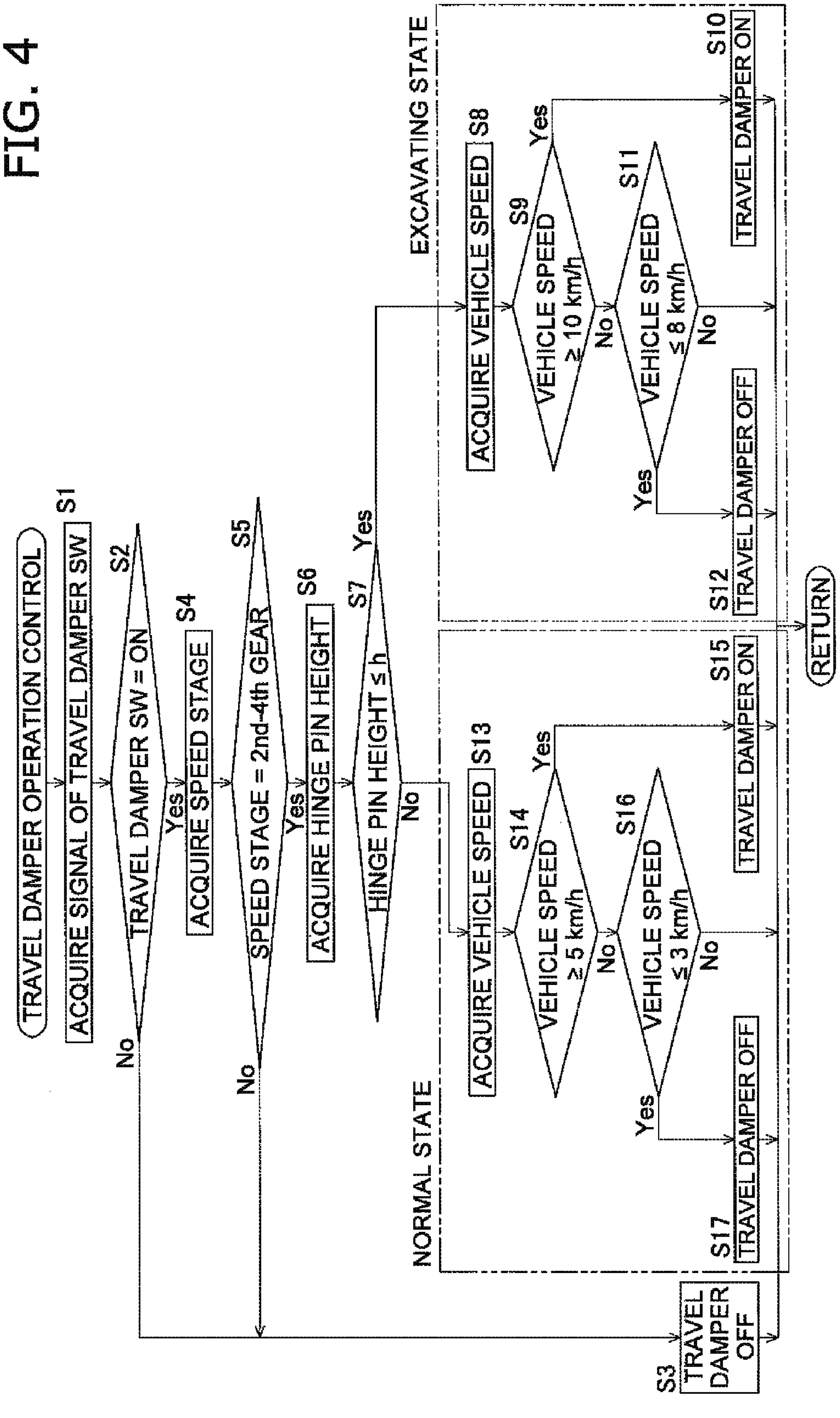
FIG. 4 is a flow chart of control according to the first embodiment.

The control process of the controller 29 is described according to the flowchart shown in FIG. 4.

In the initial state in which the vehicle is started up, the travel damper OFF state exists. In Step S1, the signal of the travel damper switch 33 is acquired. In Step S2, from the signal obtained in Step S1, it is decided whether or not the operator has turned ON the travel damper switch 33. Here, even in the case of ON operation of the travel damper switch 33, the system will remain in the travel damper OFF state as long as the conditions described below are not met.

When the travel damper switch 33 is not ON, the process transitions from Step S2 to Step S3, bringing the system to the travel damper OFF state. In specific terms, no signal is applied to the electromagnetic solenoid 35 of the pilot valve 27, thus maintaining the non-excited state. In so doing, the on-off valve 25 remains in the state shown in FIG. 2, blocking the boom cylinders 13 from the accumulator 26.

In a case of ON operation of the travel damper switch 33, the process transitions from Step S2 to Step S4. In Step S4, the signal of the speed stage sensor 32 is acquired. Next, in Step S5, based on the result of Step S4, it is decided whether the speed stage is the 1st gear, or the 2nd gear to the 4th gear. When the speed stage is 1st gear, the process transitions from Step S5 to Step S3, bringing the system to the travel damper OFF state as above. Specifically, even in the event of an ON operation of the travel damper switch 33, when the speed stage is 1st gear, because this typically means that the excavating state exists, the system is brought to the travel damper OFF state over the entire range of speed. In the case of the 2nd gear to the 4th gear, on the other hand, the process transitions from Step S5 to Step S6. In Step S6, hinge pin height is calculated on the basis of the data from the boom angle sensor 31.

Excavating State

In Step S7, it is decided whether or not the hinge pin height is equal to h or lower. When the hinge pin height is equal to h or lower, it is decided that the state of the work machine is the excavating state, and the process transitions from Step S7 to Step S8. In the process of Step S8 and later steps, travel damper ON/OFF control is executed in accordance with the second table 41 for the excavating state.

In Step S8, vehicle speed data is acquired by the vehicle speed sensor 30. In Step S9, when the vehicle speed is, for example, equal to or greater than 10, km/h (corresponding to the 3rd gear of the present invention), the process transitions from Step S9 to Step S10, and the system is brought to the travel damper ON state. In specific terms, a signal is applied to the electromagnetic solenoid 35 of the pilot valve 27 to bring about the excited state. In so doing, the on-off valve 25 is switched to the state shown in FIG. 2, and there is communication between the boom cylinders 13 and the accumulator 26.

When the vehicle speed is lower than 10, km/h, the process advances through Step S9 and Step S11, or from Step S9 to Step S11 and Step S12, whereupon a single cycle of the control process terminates. The process starting from Step S1 mentioned previously is then executed repeatedly. In cases in which the vehicle speed is lower than 10, km/h, if vehicle speed is, for example, equal to or less than 8, km/h (corresponding to the 1st gear of the present invention), the process transitions from Step S11 to Step S12. In Step S12, the state is switched to the travel damper OFF state when the travel damper ON state exists, whereas the travel damper OFF state is maintained when the travel damper OFF state exists. When the vehicle speed is not equal to or less than 8, km/h, the travel damper ON state is maintained when the travel damper ON state exists, whereas the travel damper OFF state is maintained when the travel damper OFF state exists.

Normal State

When the hinge pin height exceeds h (the position of the bucket shown by broken lines in FIG. 1), it is decided that the state of the work machine is the normal state, and the process transitions from Step S7 to Step S13. In the process of Step S13 and later steps, travel damper ON/OFF control is executed in accordance with the first table 40 for the normal state.

In Step S13, vehicle speed data is acquired by the vehicle speed sensor 30. In Step S14, when the vehicle speed is, for example, equal to or greater than 5, km/h (corresponding to the 4th gear of the present invention), the process transitions from Step S14 to Step S15, and the system is brought to the travel damper ON state. In so doing, the on-off valve 25 is switched from state shown in FIG. 2, and there is communication between the boom cylinders 13 and the accumulator 26.

When the vehicle speed is lower than 5, km/h, the process advances through Step S14 and Step S16, or from Step S14 through Step S16 and Step S17, whereupon a single cycle of the control process terminates. The process starting from Step S1 mentioned previously is then executed repeatedly. In cases in which the vehicle speed is lower than 5 km/h, if vehicle speed is, for example, equal to or less than 3, km/h (corresponding to the 2nd gear of the present invention), the process transitions from Step S16 to Step S17. In Step S17, the state is switched to the travel damper OFF state when the travel damper ON state exists, whereas the travel damper OFF state is maintained when the travel damper OFF state exists. When the vehicle speed is not equal to or less than 3, km/h and the travel damper ON state exists, the travel damper ON state is maintained, whereas the travel damper OFF state is maintained when the travel damper OFF state exists.

(1) When the state of the work machine is in the excavating state, the vehicle speed threshold value for travel damper ON/OFF control is set relatively high, whereas in the normal state, the vehicle speed threshold value is set lower than that in the excavating state. Because of this, in cases where work is performed at a sustained relatively high vehicle speed, the power of the boom cylinders 13 is transmitted directly to the work machine without being absorbed by the accumulator 26. Consequently, work efficiency at relatively high speeds is improved. In the normal state, because the vehicle speed threshold value is low, the travel damper ON state is maintained even at low speeds, and vibration during travel can be effectively suppressed.

(2) The vehicle speed threshold values for switching from the travel damper ON state to the travel damper OFF state, and the vehicle speed threshold values for switching from the travel damper OFF state to the travel damper ON state, are different in each of the states. Because of this, frequent repeated switching between ON and OFF states of the travel damper at a given vehicle speed can be prevented.

(3) Because the determination of whether the state of the work machine is the excavating state or the normal state is made from the position of the bucket, the state of the work machine can be readily determined.

(4) Because the state of the work machine is determined by designating the height of the hinge pin as the bucket height, the height of the bucket can be readily obtained.

Second Embodiment

Figure 5:
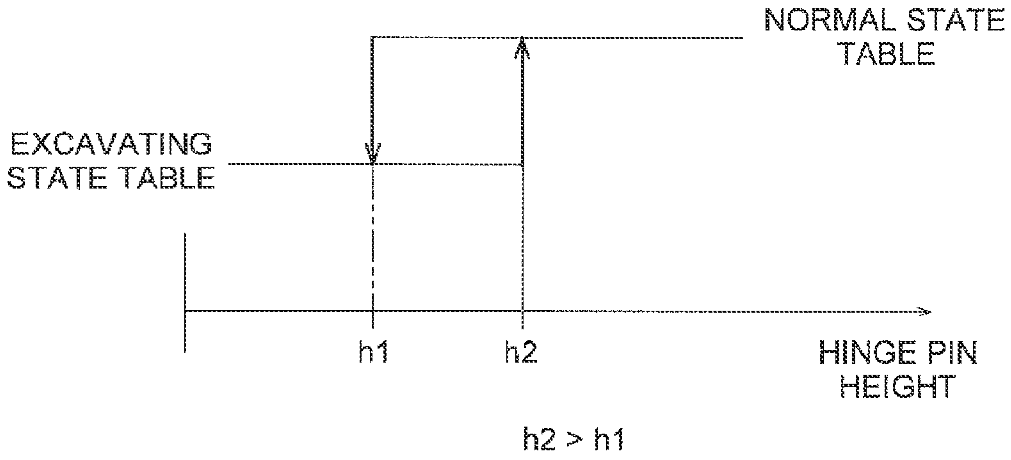
FIG. 5 is a view showing hysteresis of threshold values of hinge pin height according to a second embodiment.
Figure 6:
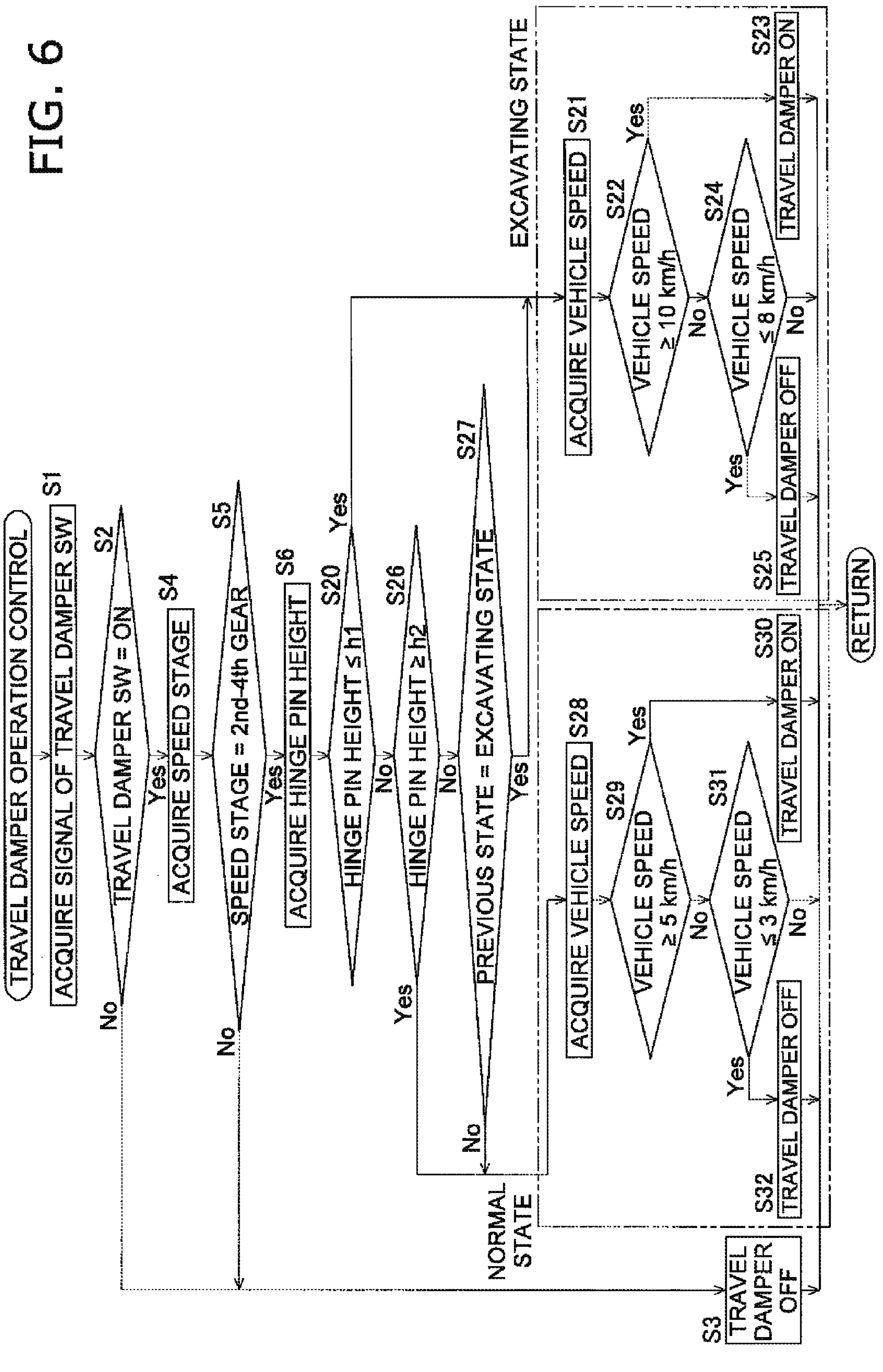
FIG. 6 is a flow chart of control according to the second embodiment.

A second embodiment of the present invention is described by FIGS. 5 and 6. In the first embodiment, hysteresis was set for the vehicle speed threshold values employed for the purpose of travel damper ON/OFF control; in the second embodiment, however, hysteresis is set not only for the vehicle speed threshold values, but also for the hinge pin height.

Specifically, as shown in FIG. 5, during the determination as to whether the state of the work machine is the normal state or the excavating state, if the hinge pin height is equal to or less than h1, it is decided that the excavating state exists, whereas if the hinge pin height is h2 (>h1), it is decided that the normal state exists. Switching from the normal state to the excavating state is performed when the hinge pin height is h1. On the other hand, switching from the excavating state to the normal state is performed when the hinge pin height is h2 (>h1).

The preceding control process is shown in FIG. 6. In FIG. 6, the process from Step S1 to Step S7 is comparable to that in the first embodiment, and a description will be omitted here.

Excavating State

In Step S20, it is decided whether or not the hinge pin height is equal to or less than h1. When the hinge pin height is equal to or less than h1, it is decided that the state of the work machine is the excavating state, and the process transitions from Step S20 to Step S21. In the process of Step S21 and later steps, travel damper ON/OFF control is executed in accordance with the second table 41 for the excavating state.

In Step S21, vehicle speed data is acquired by the vehicle speed sensor 30. In Step S22, when the vehicle speed is, for example, equal to or greater than 10, km/h, the process transitions from Step S22 to Step S23, and the system is brought to the travel damper ON state. When the vehicle speed is lower than 10, km/h, the process advances through Step S22 and Step S24, or from Step S22 through Step S24 and Step S25, whereupon a single cycle of the control process terminates. The process starting from Step S1 mentioned previously is then executed repeatedly. When the vehicle speed is lower than 10, km/h, and if vehicle speed is, for example, equal to or less than 8, km/h, the process transitions from Step S24 to Step S25. In Step S25, the state is switched to the travel damper OFF state when the travel damper ON state exists, whereas the travel damper OFF state is maintained when the travel damper OFF state exists. When the vehicle speed is not equal to or less than 8, km/h, the travel damper ON state is maintained when the travel damper ON state exists, whereas the travel damper OFF state is maintained when the travel damper OFF state exists.

Transition From Excavating State To Normal State

Here, in a case of transitioning to a traveling state upon termination of excavation work, the bucket 11 is lifted, and the height of the hinge pin is lifted. Then, when the hinge pin height has exceeded h1, the process transitions from Step S20 to Step S26. In Step S26, it is decided whether or not the hinge pin height is equal to or greater than h2. When the hinge pin height h1 exceeds h1 but is lower than h2, the process transitions from Step S26 to Step S27. In Step S27, it is decided whether or not the previous state of the work machine was the excavating state. Here, because the previous state of the work machine was the excavating state, the process transitions from Step S27 to Step S21. The excavating state process discussed previously is thus executed.

In this way, the excavating state is maintained until the hinge pin height reaches h2 (>h1), rather than immediately switching to the normal state when the hinge pin height has exceeded h1. Specifically, hysteresis is set for the threshold values of hinge pin height for the purpose of determining the state of the work machine.

Normal State

When the hinge pin height is equal to or greater than h2, it is decided that the state of the work machine is the normal state, and the process transitions from Step S26 to Step S28. In the process of Step S28 and later steps, travel damper ON/OFF control is executed in accordance with the first table 40 for the normal state.

In Step S28, vehicle speed data is acquired by the vehicle speed sensor 30. In Step S29, when the vehicle speed is, for example, equal to or greater than 5, km/h, the process transitions from Step S29 to Step S30, and the system is brought to the travel damper ON state. When the vehicle speed is lower than 5, km/h, the process advances through Step S29 and Step S31, or from Step S29 through Step S31 and Step S32, whereupon a single cycle of the control process terminates. The process starting from Step S1 mentioned previously is then executed repeatedly. When the vehicle speed is lower than 5, km/h, if vehicle speed is, for example, equal to or less than 3, km/h, the process transitions from Step S31 to Step S32. In Step S32, the state is switched to the travel damper OFF state when the travel damper ON state exists, whereas the travel damper OFF state is maintained when the travel damper OFF state exists. When the vehicle speed is not equal to or less than 3, km/h, the travel damper ON state is maintained when the travel damper ON state exists, whereas the travel damper OFF state is maintained when the travel damper OFF state exists.

Transition From Normal State To Excavating State

In a case of resuming excavation work, the bucket 11 is lowered, and the height of the hinge pin becomes lower. When the hinge pin height is lower than h2 but higher than h1, the process then transitions to Step S27 via Step S20 and Step S26. In Step S27, it is decided whether or not the previous state of the work machine was the excavating state. Here, because the previous state of the work machine was the normal state, the process transitions from Step S27 to Step S28, and the normal state process discussed previously is executed. If the hinge pin height subsequently declines further to the point that the hinge pin height is equal to or less than h1, the process transitions from Step S20 to Step S21, and the excavating state process discussed previously is executed.

In this way, whereas the threshold value of hinge pin height for switching to the normal state is h2, the threshold value of hinge pin height for switching from the normal state to the excavating state is h1. Specifically, hysteresis is set for the threshold values of hinge pin height for the purpose of determining the state of the work machine.

According to this embodiment, hysteresis is introduced as well into the threshold values of hinge pin height for the purpose of determining the state of the work machine. Therefore, in addition to working effects comparable to the first embodiment, in the second embodiment, it is possible to prevent frequent modification of the tables for ON/OFF switching control of the travel damper in cases in which the position of the bucket rises and falls in proximity to the threshold value during travel.

Other Embodiments

The present invention is not limited by the embodiments set forth above, and various modifications and improvements thereto are possible without departing from the scope and spirit of the present invention.

(a) Whereas in the aforedescribed embodiments, the determination as to whether the state of the work machine is the excavating state or the normal state is made with reference to the hinge pin height, the determination may instead be made with reference to another element instead. For example, the determination as to the state of the work machine could be made with reference to bucket angle, operation of a boom control lever, operation of a bucket control lever, or to a combination of several of these elements.

For example, instead of hinge pin height h, the condition for determination could be a bucket angle θ (the angle of the bucket shown by broken lines in FIG. 1) representing the angle defined by the surface of the ground and the bottom surface of the bucket. In this case, the condition for determination would be a bucket angle θ that is greater by a predetermined angle than the bucket angle at which the bottom surface of the bucket is substantially horizontal. When the bucket angle is smaller than 0,, the state of the work machine would then be determined to be the excavating state.

The bucket angle θ may also be employed concomitantly with the hinge pin height h as a reference criterion for the determination. In this case, when the hinge pin height h is equal to or less than a predetermined height and the bucket angle θ is equal to or less than a predetermined angle, the state of the work machine would be determined to be the excavating state. In this case, it can be determined with better accuracy whether or not to expect that excavation will be performed.

(b) Whereas the angle of the boom was detected in order to obtain the hinge pin height, the boom angle can be detected by detection means such as, for example, a potentiometer, a limit switch, or the like. This applies to detection of bucket angle as well.

(c) Whereas the hinge pin height was obtained in order to obtain the bucket height, the configuration for obtaining the bucket height is not limited to that in the aforedescribed embodiments.

(d) Whereas in the aforedescribed embodiments, in cases in which the hinge pin height is neither equal to or less than h1 nor equal to or greater than h2, the previous state is maintained, an intermediate state may be set instead. For example, there may be furnished an intermediate state whereby, in cases in which the hinge pin height is neither equal to or less than h1 nor equal to or greater than h2, the travel damper goes ON at a vehicle speed equal to or greater than 10, km/h, and the travel damper goes OFF at a vehicle speed equal to or less than 3, km/h.

With the travel vibration suppressing device according to the present invention, the determination as to whether the excavating state exists or a normal state in which excavation is not performed exists can be made more precisely, and sufficient power can be delivered to the work machine particularly at times of excavation at relatively high speed, while maintaining ride quality. Also, damage to the accumulator by excessive hydraulic pressure acting on the accumulator during excavation can be minimized

The invention claimed is:

1. A travel vibration suppressing device of a work vehicle, connected to a hydraulic cylinder for operating a work machine and adapted to suppress vibration during vehicle travel, the travel vibration suppressing device comprising:

an accumulator configured to be connected to the hydraulic cylinder;

a control valve configured to bring about communication or blocking between the hydraulic cylinder and the accumulator;

a vehicle speed detecting device configured to detect vehicle speed of the work vehicle;

a work machine state determination section configured to determine whether the state of the work machine is an excavating state in which excavation is expected to be performed using the work machine, or a normal state in which excavation by the work vehicle is not performed; and a control unit configured to control the control valve according to the determination result of the work machine state determination section; wherein the control unit is configured to upon determining the state of the work machine to be the excavating state, switch from a state of communication between the hydraulic cylinder and the accumulator to a blocked state when the vehicle speed changes from a speed exceeding a first speed to a speed which is equal to or less than the first speed, and upon determining the state of the work machine to be the normal state, switch from the state of communication between the hydraulic cylinder and the accumulator to the blocked state when the vehicle speed changes from a speed exceeding a second speed which is lower than the first speed to a speed which is equal to or less than the second speed.

2. The travel vibration suppressing device in a work vehicle according to claim 1, wherein the control unit is configured to in the excavating state, place the hydraulic cylinder and the accumulator in the state of communication therebetween when the vehicle speed is equal to or greater than a third speed which is higher than the first speed; and in the normal state, place the hydraulic cylinder and the accumulator in the state of communication therebetween when the vehicle speed is equal to or greater than a fourth speed which is higher than the second speed.

3. The travel vibration suppressing device in a work vehicle according to claim 1, wherein the work machine has a boom lifted and lowered by the hydraulic cylinder, and a bucket rotatably mounted to the distal end of the boom via a hinge pin, and the work machine state determination section is configured to determine the state of the work machine from the height of the bucket.

4. The travel vibration suppressing device in a work vehicle according to claim 3, wherein the work machine state determination section is configured to determine that the excavating state exists when the height of the bucket is equal to or less than a predetermined height, and determine that the normal state exists when the height of the bucket exceeds the predetermined height.

5. The travel vibration suppressing device in a work vehicle according to claim 3, wherein the work machine state determination section is configured to determine that the excavating state exists when the height of the bucket is equal to or less than a first height, and determine that the normal state exists when the height of the bucket is equal to or greater than a second height which is higher than the first height, and the control unit is configured to execute control such that the state of the work machine remains in the excavating state until the height of the bucket reaches the second height when transitioning from the excavating state to the normal state, and execute control such that the state of the work machine remains in the normal state until the height of the bucket reaches the first height when transitioning from the normal state to the excavating state.

6. The travel vibration suppressing device in a work vehicle according to claim 3, wherein the work machine state determination section is configured to designate the height of the hinge pin as the height of the bucket when determining the state of the work machine.

7. The travel vibration suppressing device in a work vehicle according to claim 3, wherein the work machine state determination section is configured to determine that the excavating state exists when the height of the bucket is equal to or less than a first height, determine that the normal state exists when the height of the bucket is equal to or greater than a second height which is higher than the first height, and determine that an intermediate state exists when the height of the bucket is lower than the second height which is higher than the first height, and the control unit is configured to upon determining the state of the work machine to be the intermediate state, place the hydraulic cylinder and the accumulator in the communicating state when the vehicle speed is equal to or greater than the third speed, and place the hydraulic cylinder and the accumulator in the blocked state when the vehicle speed is equal to or less than the second speed.

* * * * *